(12) United States Patent
Koo (10) Patent No.: US 12,523,340 B2
(45) Date of Patent: Jan. 13, 2026

(54) RECEPTACLE FOR HYDROGEN CHARGING OF FUEL CELL VEHICLE

(71) Applicants: Hyundai Motor Company, Seoul (KR); Kia Corporation, Seoul (KR)

(72) Inventor: Jin Woo Koo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 84 days.

(21) Appl. No.: 18/421,474

(22) Filed: Jan. 24, 2024

(65) Prior Publication Data

US 2025/0129887 A1   Apr. 24, 2025

(30) Foreign Application Priority Data

Oct. 19, 2023 (KR) .................. 10-2023-0140043

(51) Int. Cl.
| | |
|---|---|
| *F17C 5/00* | (2006.01) |
| *F16L 17/02* | (2006.01) |
| *F16L 17/035* | (2006.01) |
| *H01M 8/04082* | (2016.01) |
| *H01M 8/10* | (2016.01) |

(52) U.S. Cl.
CPC .............. *F17C 5/007* (2013.01); *F16L 17/02* (2013.01); *F16L 17/035* (2013.01); *H01M 8/04208* (2013.01); *F17C 2205/0341* (2013.01); *F17C 2205/037* (2013.01); *F17C 2221/012* (2013.01); *F17C 2265/065* (2013.01); *F17C 2270/0168* (2013.01); *F17C 2270/0184* (2013.01); *H01M 2008/1095* (2013.01); *H01M 2250/20* (2013.01)

(58) Field of Classification Search
CPC ............ F17C 13/06; F16L 21/03; F16L 21/02
See application file for complete search history.

(56) References Cited

U.S. PATENT DOCUMENTS

| | | | | |
|---|---|---|---|---|
| 2010/0269956 A1* | 10/2010 | Iida | .......................... | F16L 21/03 141/311 R |
| 2014/0374417 A1* | 12/2014 | Ozaki | ..................... | B60L 50/72 220/86.1 |
| 2019/0027765 A1* | 1/2019 | Jones | ...................... | F16L 37/04 |

FOREIGN PATENT DOCUMENTS

JP          5805220 B2     11/2015

* cited by examiner

*Primary Examiner* — Timothy P. Kelly
(74) *Attorney, Agent, or Firm* — SLATER MATSIL, LLP (57) ABSTRACT

In an embodiment, a receptacle for hydrogen charging of a fuel cell vehicle capable of reliably maintaining seal with a charging nozzle during rapid hydrogen charging, wherein the receptacle includes a body including a nozzle insertion portion configured for a nozzle tip of the charging nozzle to be inserted therein, a filter space portion having installed therein a filter, and a passage space portion provided between the nozzle insertion portion and the filter space portion; and a sealing device having a spring and seal member, configured to seal between a tip end portion of the nozzle tip and an inner side surface of an extended space portion by being installed in the extended space portion extended in a radial direction centered on the tip end portion of the nozzle tip which has passed through the nozzle insertion portion and entered the passage space portion.

18 Claims, 7 Drawing Sheets

[ BEFORE INSERTION ]   [ INSERTED ]

RECEPTACLE FOR HYDROGEN CHARGING OF FUEL CELL VEHICLE

CROSS-REFERENCE TO RELATED APPLICATIONS

This application claims, under 35 U.S.C. § 119 (a), the benefit of and priority to Korean Patent Application No. 10-2023-0140043, filed on Oct. 19, 2023, the entire contents of which are incorporated herein by reference.

TECHNICAL FIELD

The present disclosure relates to a receptacle of a fluid charge system.

BACKGROUND

Currently, a proton exchange membrane fuel cell or a polymer electrolyte membrane fuel cell (PEMFC) having high power-density is widely used as a fuel cell for a vehicle. The PEMFC uses hydrogen as fuel gas and oxygen or oxygen-containing air as oxidizer gas.

Because a fuel cell vehicle uses electrical energy generated through electrochemical reaction of hydrogen and oxygen in a fuel cell as power and uses hydrogen as a fuel to generate electrical energy through the electrochemical reaction, the fuel cell vehicle is equipped with one or more hydrogen tanks in which high-pressure hydrogen is charged.

In the hydrogen tank of the fuel cell vehicle, a receptacle for hydrogen charging that functions as a check valve is installed. With the receptacle, hydrogen may be charged in the hydrogen tank in the vehicle by connecting a charging nozzle connected to a buffer tank at a hydrogen charging station to the receptacle of the vehicle.

When charging hydrogen in the fuel cell vehicle, when the pressure of the hydrogen charged in the hydrogen tank reaches the buffer pressure, the receptacle is closed by the hydrogen pressure in the hydrogen tank, completing the hydrogen charging in the hydrogen tank.

Meanwhile, the temperature of the hydrogen supplied to the vehicle during rapid hydrogen charging is very low, ranging from −33° C. to −40° C., and due to the very low hydrogen charging temperature, freezing may occur at an area where the charging nozzle and the receptacle are connected to each other (around the receptacle) if charging continues for more than a predetermined period of time. The frequency of freezing events tends to increase in summer when humidity is high.

When freezing occurs, the gas being charged may leak due to low-temperature shrinkage of an O-ring that maintains airtightness between the charging nozzle and the receptacle during charging.

Charging nozzles and receptacles are designed and manufactured according to the Society of Automotive Engineers (SAE) standards, but gas leakage may occur as a rubber O-ring shrinks due to rapid hydrogen charging in a cryogenic environment.

Moreover, the nozzle tip of the charging nozzle and the O-ring of the receptacle must adhere well to each other in all 360° directions. However, when the charging nozzle is sagged in the direction of gravity due to its own weight, the O-ring may be pressed in one direction, and the airtightness between the charging nozzle and the receptacle may not be maintained and gas leakage may occur.

Additionally, due to freezing, there are frequent cases where it is hard to detach or separate the charging nozzle from the receptacle after charging is completed. As many situations occur where the charging nozzle cannot be removed due to freezing, workers at a charging station attempt to forcibly detach the charging nozzle, and in the process, the O-ring that maintains airtightness may be damaged.

The above information disclosed in this Background section is only for enhancement of understanding of the background of the present disclosure, and therefore it may contain information that does not form the prior art as defined by the patent statute.

SUMMARY

The present disclosure relates to a receptacle of a fluid charge system. More particularly, the present disclosure relates to a receptacle for hydrogen charging that ensures airtightness with a charging nozzle during rapid hydrogen charging in a fuel cell vehicle.

The present disclosure has been made in an effort to solve the above-described problems, which may be associated with the prior art, and accordingly an embodiment of the present disclosure provides a receptacle for hydrogen charging having a structure that strengthens the airtightness between a charging nozzle and the receptacle when charging hydrogen in a fuel cell vehicle to thereby reliably maintain the airtightness between the charging nozzle and the receptacle during charging or after charging is completed.

An embodiment of the present disclosure provides a receptacle capable of solving various conventional problems, such as gas leakage that occurs as the O-ring shrinks due to rapid cooling during rapid hydrogen charging, gas leakage that occurs when the charging nozzle is sagging due to its own weight, and gas leakage due to the mounting of the charging nozzle and receptacle, for example.

In an embodiment of the present disclosure, a receptacle for hydrogen charging of a fuel cell vehicle includes a body including a nozzle insertion portion into which a nozzle tip of a charging nozzle is inserted, a filter space portion having installed therein a filter portion configured to filter hydrogen injected therein through the nozzle tip of the charging nozzle, and a passage space portion provided between the nozzle insertion portion and the filter space portion, and a sealing device configured to seal between a tip end portion of the nozzle tip and an inner side surface of an extended space portion by being installed in the extended space portion extended in a radial direction centered on the tip end portion of the nozzle tip that has passed through the nozzle insertion portion and entered the passage space portion.

In an embodiment, the receptacle may further include an O-ring configured to seal between the nozzle tip and the inner side surface of the nozzle insertion portion by being installed at the inner side surface of the nozzle insertion portion through which the nozzle tip of the charging nozzle passes.

In an embodiment, the sealing device may include a movable O-ring installed in the extended space portion and a spring member configured to elastically support the movable O-ring by being installed on a spring support step formed on an inner side surface of the body and being positioned between the nozzle insertion portion and the passage space portion. In an embodiment, when the pressure of the hydrogen injected through the nozzle tip of the charging nozzle acts on the extended space portion in the passage space portion during hydrogen charging, the movable O-ring may move while compressing the spring member using the pressure of the hydrogen to sit on an outer circumferential surface of the tip end portion of the nozzle tip.

In an embodiment, when hydrogen charging is completed and the pressure in the extended space portion is released, the movable O-ring may be separated from the tip end portion of the nozzle tip by the elastic restoring force of the spring member.

In an embodiment, the sealing device may include a pressure seal installed within the extended space portion and a spring member configured to elastically support the pressure seal by being installed on a spring support step formed on the inner side surface of the body and being positioned between the nozzle insertion portion and the passage space portion. In an embodiment, when the pressure of the hydrogen injected through the nozzle tip of the charging nozzle acts on the extended space portion in the passage space portion during hydrogen charging, the pressure seal may move while compressing the spring member using the pressure of the hydrogen to sit on the outer circumferential surface of the tip end portion of the nozzle tip.

In an embodiment, the pressure seal may include a seal body having a ring shape as a whole and having a c-shaped cross section, and an elastic member installed in the inner side of the c-shaped cross-sectional portion of the seal body.

In an embodiment, the pressure seal may have an opening, having the c-shaped cross section and facing forward in the extended space portion with respect to the insertion direction of the nozzle tip, and as the pressure of the hydrogen acts into the seal body through the opening, the inner and outer side portions of the seal body may spread apart, so that the inner side portion is brought into close contact with the outer circumferential surface of the nozzle tip and the outer side portion is brought into close contact with the inner side surface of the extended space portion to thereby generate a surface pressure.

It can be understood that the term "vehicle" or "vehicular" or other similar terms as used herein can be inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum), for example. As referred to herein, a hybrid vehicle can be a vehicle that has two or more sources of power, for example, a vehicle powered by both gasoline and electricity.

BRIEF DESCRIPTION OF THE DRAWINGS

The above and other features of the present disclosure will now be described in detail with reference to certain example embodiments thereof illustrated in the accompanying drawings, which are given hereinbelow by way of illustration only, and thus are not necessarily limitative of the present disclosure, and wherein.

It can be understood that the appended drawings are not necessarily to scale, presenting a somewhat simplified representation of various features illustrative of the basic principles and embodiments of the present disclosure. The specific design features of an embodiment of the present disclosure, including, for example, specific dimensions, orientations, locations, and shapes, can be determined in part by a particular intended application and usage environment, for example.

In the figures, the reference numbers can refer to the same or equivalent parts of the present disclosure throughout the several figures of the drawing.

DETAILED DESCRIPTION OF ILLUSTRATIVE EMBODIMENTS

Embodiments of the present disclosure will be described in detail with reference to the accompanying drawings. Descriptions of specific structures or functions presented in the embodiments of the present disclosure are merely examples for the purpose of explaining the embodiments according to concepts of the present disclosure, and the embodiments according to concepts of the present disclosure may be implemented in various forms. In addition, the descriptions should not necessarily be construed as being limited to the embodiments described herein, and can be understood to include all modifications, equivalents, and substitutes falling within the ideas and scope of the present disclosure.

In this specification, the terms "first," "second," etc. may be used to describe various components, but the components are not necessarily limited to the terms. These terms can be used to only distinguish one component from another. For example, a first component could be termed a second component, and similarly, a second component could be termed a first component, without departing from the scope of example embodiments of the present disclosure.

It can be understood that when a component is referred to as being "connected to" another component, the component may be directly connected to the other component or intervening components may also be present. In contrast, when a component is referred to as being "directly connected to" another component, there are no intervening components present. Other terms used to describe relationships between components can be interpreted in a like fashion (e.g., "between" versus "directly between," "adjacent" versus "directly adjacent," etc.).

Throughout the specification, like reference numerals can indicate like components. The terminology used herein is for the purpose of illustrating embodiments and is not necessarily intended to limit the present disclosure. In this specification, the singular form can include plural forms unless specified otherwise. The terms "comprises" and/or "comprising" used in this specification mean that the cited component, step, operation, and/or element does not necessarily exclude the presence or addition of one or more of other components, steps, operations, and/or elements.

Before describing the embodiments of the present disclosure, a known receptacle for hydrogen charging will be described to facilitate understanding of the present disclosure.

Figure 1:
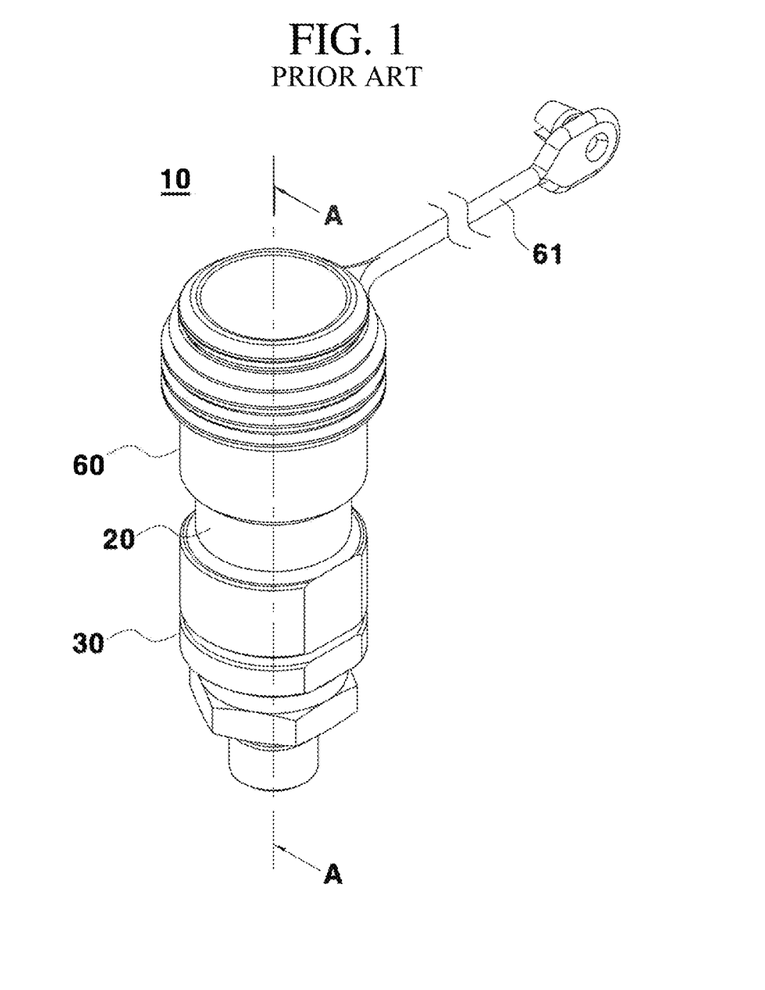
FIG. 1 is a perspective view of a known receptacle for hydrogen charging.
Figure 2:
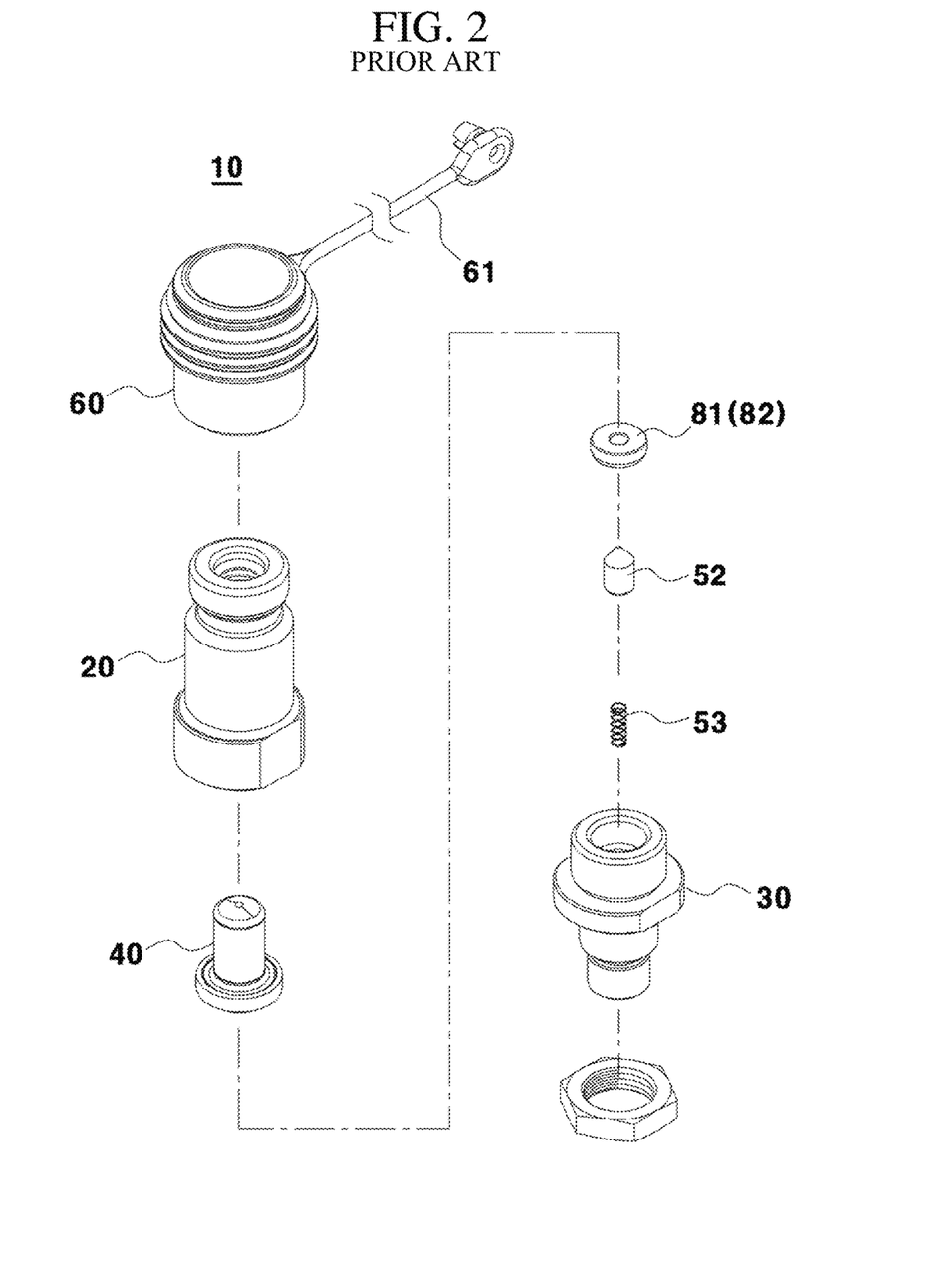
FIG. 2 is an exploded perspective view of the receptacle for hydrogen charging illustrated in FIG. 1.
Figure 3:
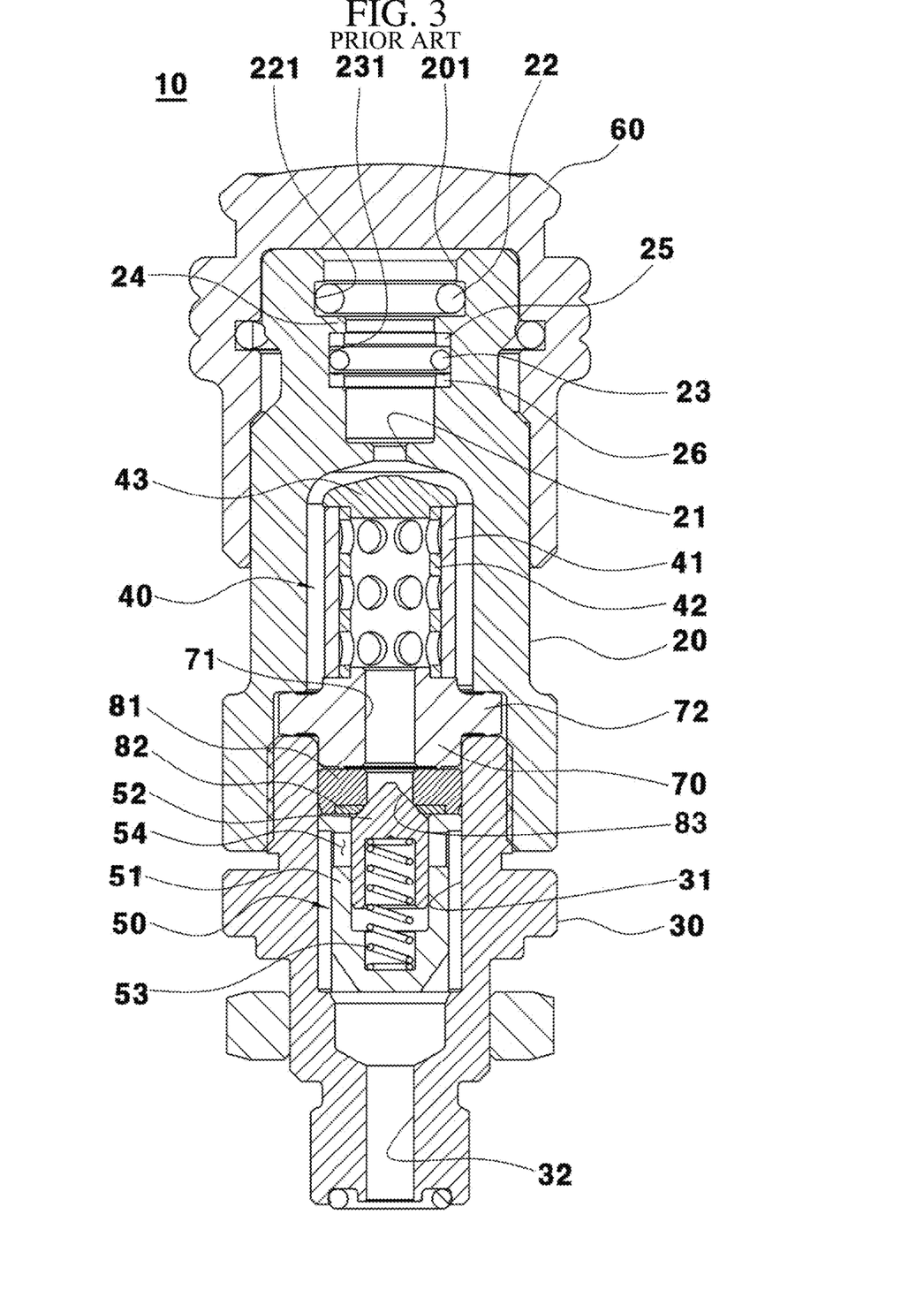
FIG. 3 is a cross-sectional view taken along line A-A in FIG. 1.

FIG. 1 is a perspective view of a known receptacle for hydrogen charging. FIG. 2 is an exploded perspective view of the receptacle for hydrogen charging illustrated in FIG. 1. FIG. 3 is a cross-sectional view taken along line A-A in FIG. 1, illustrating the receptacle installed in a hydrogen tank of a fuel cell vehicle.

In the description of FIGS. 1 to 3, terms indicating direction such as "up," "down," "left," "right," "front," and "rear" are defined as indicating each direction based on the state shown in each drawing.

As illustrated in the drawings, a receptacle 10 for hydrogen charging may include a first body 20 and a second body 30, which are coupled to a charging nozzle (not shown) configured to supply fuel (hereinafter, fuel is hydrogen for example) and into which fuel is supplied from the charging nozzle, a filter portion 40 installed within the first body 20 and configured to filter the fuel being charged, and a valve portion 50 installed within the second body 30 and configured to prevent backflow of the fuel being charged. Moreover, the receptacle 10 for hydrogen charging may further include a fuel cap 60 coupled to an inlet side of the first body 20.

The first body 20 may have a substantially cylindrical shape with open upper and lower surfaces, and may have formed therein a movement passage 21 through which the fuel being charged moves. The open portion in the upper surface of the first body 20 may have formed therein a nozzle insertion portion 201 into which the charging nozzle may be inserted and coupled, and the fuel cap 60 may be coupled to the outer circumferential surface of the upper end portion of the first body 20.

The fuel cap 60 can serve to protect the upper end portion of the first body 20 through which fuel is introduced, and prevent foreign substances such as moisture, oil, and dust from being introduced into the first body 20. The fuel cap 60 may have a cylindrical shape with an open lower surface, and may be connected to a vehicle body (not shown) using a tether 61 to prevent loss when charging.

At the inner circumferential surface of the nozzle insertion portion 201 formed at the upper end portion of the first body 20, a first ring 22 and a second ring 23, which are O-rings configured to prevent fuel leakage when connecting the nozzle tip of the charging nozzle, may be installed by being spaced apart from each other at a predetermined distance. The first ring 22 can serve to seal a first charging nozzle (not shown) that charges fuel at low pressure, and the second ring 23 can serve to seal a second charging nozzle (not shown) that charges fuel at high pressure.

A stepped portion 24 corresponding to the diameter of the second charging nozzle, which is smaller than that of the first charging nozzle, may be formed at the inner circumferential surface of the upper end portion of the first body 20. Furthermore, a first installation groove 221 in which the first ring 22 is installed may be formed in the upper portion of the stepped portion 24, and a second installation groove 231 in which the second ring 23 is installed may be formed in the lower portion of the stepped portion 24.

In the second installation groove 231, a first backup ring 25 and a second backup ring 26 may be installed above and below the second ring 23, respectively. The first backup ring 25 and the second backup ring 26 each can serve to minimize the movement and deformation of the second ring 23 being pushed upward or downward due to the charging pressure of fuel charged at high pressure.

The second body 30 can have a substantially rectangular parallelepiped shape with open upper and lower surfaces, and can have an upper end portion inserted into the lower end portion of the first body 20 and coupled thereto. The second body 30 may have formed therein an installation space 31 in which the valve portion 50 can be installed, and may have formed at the lower end portion thereof a supply passage 32 configured to supply fuel, supplied by the opening operation of the valve portion 50, to a fuel tank.

The filter portion 40 may include a filter 41 configured to filter the fuel being charged, a protector 42 installed within the filter 41, and a cap 43 coupled to the upper ends of the filter 41 and the protector 42.

The protector 42 can be installed within the filter 41 and serve to prevent deformation of the filter 41 under high pressure conditions. The cap 43 can serve as a lid so that the fuel supplied through the movement passage 21 in the first body 20 is filtered while moving from the outside to the inside of the filter 41. The cap 43 can have an insertion portion protruding downward, and the cap 43 can be fixed to the protector 42 by the insertion portion inserted into the protector 42.

The valve portion 50 may include, as illustrated in FIG. 3, a cylindrical member 51 installed in the installation space 31 in the second body 30, a valve body 52 installed to be raised and lowered within the cylindrical member 51 and configured to open and close a passage through which fuel is charged, and a spring 53 installed within the cylindrical member 51 and configured to provide an elastic force to the valve body 52.

The cylindrical member 51 may have a substantially cylindrical shape with an open upper surface, and may have an outer diameter smaller than the inner diameter of the installation space 31. The side surface of the cylindrical member 51 may have formed therein a plurality of discharge holes 54 configured to discharge the fuel introduced into the cylindrical member 51 to the outside.

With this configuration, the fuel supplied into the cylindrical member 51 during the opening operation of the valve body 52 is discharged out of the cylindrical member 51 through the discharge holes 54, passes through the installation space 31 in the second body 30, and then is supplied to the supply passage 32 formed in the lower portion of the second body 30.

The valve body 52 normally blocks the passage by being raised by the elastic force of the spring 53. When the pressure transmitted through the passage increases, the valve body 52 moves downward while elastically deforming the spring 53 so that the spring 53 is reduced in length to thereby open the passage.

Between the filter portion 40 and the valve portion 50, there may be installed a sealing member 70 configured to seal between the lower end portion of the first body 20 and the upper end portion of the second body 30, and a first sheet 81 and a second sheet 82 configured to seal between the sealing member 70 and the cylindrical member 51 and valve body 52 of the valve portion 50.

The sealing member 70 can have a substantially cylindrical shape with a delivery passage 71, through which fuel is charged, formed in the central portion thereof. The outer circumferential surface of the sealing member 70 may have formed thereon a flange 72 coupled between the lower end of the space inside the first body 20 and the upper end of the second body 30.

Each of the first sheet 81 and the second sheet 82 is disposed at the upper end of the cylindrical member 51 and serves to seal between the sealing member 70 and the cylindrical member 51 and valve body 52. The first sheet 81 and the second sheet 82 have a central portion having formed therein a charging passage 83 through which fuel is charged. The charging passage 83 may be blocked by a convex upper end portion of the valve body 52 when the valve body 52 moves upward.

The second sheet 82 can have a smaller strength than the valve body 52 and the first sheet 81, and thus may serve to perform sealing when fuel is charged at low pressure. The first sheet 81 can have a greater strength than the second sheet 82, and thus may serve to perform sealing when fuel is charged at high pressure.

The configuration of one example of known receptacles has been described and illustrated in FIGS. 1-3. A receptacle according to an embodiment of the present disclosure may be an improved version of the known receptacle illustrated in FIGS. 1 to 3.

In other words, a receptacle according an embodiment of to the present disclosure may be similar to the known receptacle in its main configuration, except that a sealing device, which will be described later, is additionally installed and that the shape or structure of the body can be somewhat changed to install the sealing device.

For example, a receptacle according to an embodiment of the present disclosure may be similar to the known receptacle in that the receptacle includes the first body and the second body, the first ring and the second ring are installed at the inner side surface of the nozzle insertion portion, and the filter portion, the valve portion, and other various components are installed, formed, and attached to the first body and the second body.

Figure 4:
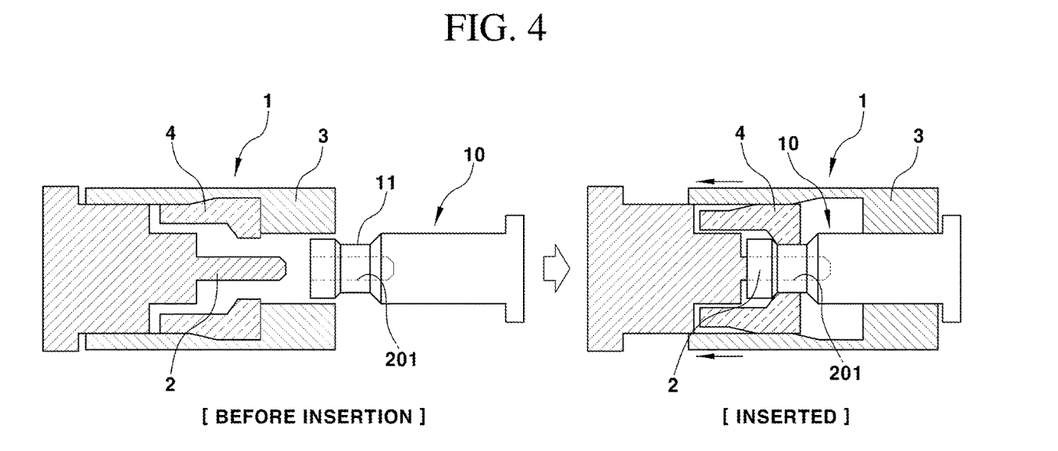
FIG. 4 is a view schematically illustrating a process in which a nozzle tip of a charging nozzle is inserted into a receptacle for hydrogen charging according to an embodiment of the present disclosure.

In a receptacle according to an embodiment of the present disclosure, the nozzle tip of a charging nozzle is inserted into and coupled to the above-described receptacle for hydrogen charging. FIG. 4 is a view schematically illustrating a process in which the nozzle tip of the charging nozzle is inserted into the receptacle for hydrogen charging according to an embodiment of the present disclosure.

As illustrated in the drawings, when a charging nozzle 1 is coupled to a receptacle 10 installed at a hydrogen tank side to charge hydrogen, which is fuel, the receptacle 10 can be inserted into a sleeve 3 of the charging nozzle 1.

Thereafter, the sleeve 3 can be coupled to the receptacle 10 by a set or predetermined position on the outer side surface of the receptacle 10, and a chuck 4 of the charging nozzle 1 can be inserted into a groove 11 in the receptacle 10 and coupled thereto. As such, the charging nozzle 1 is coupled to the receptacle 10.

Moreover, when the charging nozzle 1 is coupled to the receptacle 10, a nozzle tip 2 of the charging nozzle 1 can be inserted into the receptacle 10. Once the nozzle tip 2 of the charging nozzle 1 is inserted into the receptacle 10, i.e., inserted into the receptacle 10 by a set or predetermined position on the inner side of the nozzle insertion portion 201 in a first body 20, injection and charging of hydrogen can be available.

Figure 5:
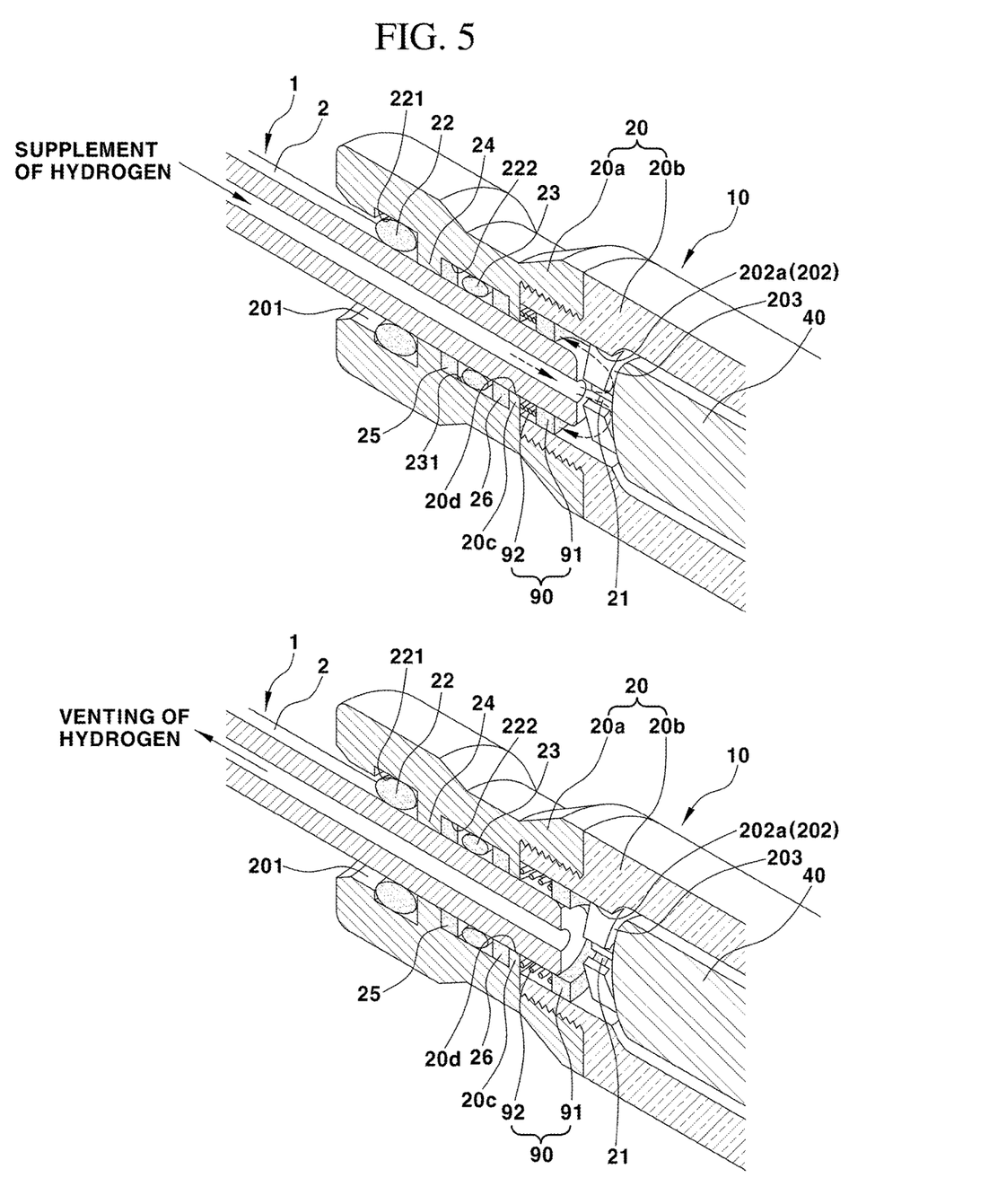
FIG. 5 is an enlarged cross-sectional view of a portion of a receptacle for hydrogen charging according to a first embodiment of the present disclosure.

FIG. 5 is an enlarged cross-sectional view of a portion of a receptacle for hydrogen charging according to a first embodiment of the present disclosure, illustrating a portion of a receptacle 10 including a nozzle insertion portion 201 into which a nozzle tip 2 of a charging nozzle 1 can be inserted and coupled, and illustrating states during charging and when charging is completed.

At the inner circumferential surface of the nozzle insertion portion 201 formed at the end portion of a first body 20, a first ring 22 and a second ring 23, which can be O-rings configured to prevent hydrogen leakage when the nozzle tip 2 of the charging nozzle 1 is connected, can be installed by being spaced apart from each other at a set, selected, or predetermined distance.

At the inner circumferential surface of the nozzle insertion portion 201 in the first body 20 into which the nozzle tip 2 of the charging nozzle 1 is inserted, a stepped portion 24 may be formed. At one side of the nozzle insertion portion 201 with respect to the stepped portion 24, a first installation groove 221 in which the first ring 22 can be installed may be formed. At the other side of the nozzle insertion portion 201 with respect to the stepped portion 24, a second installation groove 231 in which the second ring 23 can be installed may be formed.

In the second installation groove 231, a first backup ring 25 and a second backup ring 26 may be installed at opposite sides of the second ring 23, respectively. The first backup ring 25 and the second backup ring 26 can each serve to minimize the movement and deformation of the second ring 23 being pushed to the sides due to the charging pressure of hydrogen charged at high pressure.

The first body 20 can have formed therein a passage space portion 202 in communication with the nozzle insertion portion 201. The passage space portion 202 can communicate with a filter space portion 203 (denoted as reference numeral 31 in FIG. 3), which can be an installation space in which a filter portion 40 can be installed in the first body 20. The passage space portion 202 can communicate with a primary-side space in the filter space portion 203 where hydrogen moves before passing through a filter portion 40 (not fully shown, e.g., see reference numeral 41 in FIG. 3) (hydrogen before filtration).

Inside the first body 20, the nozzle tip 2 of the charging nozzle 1 inserted into the nozzle insertion portion 201 can be supported by the inner circumferential surface of the second ring 23 by being in close contact therewith. The tip end portion of the nozzle tip 2 can pass through the nozzle insertion portion 201 and then enters the passage space portion 202 up to at least a portion of the passage space portion 202.

Moreover, in the receptacle according to the first embodiment of the present disclosure, the passage space portion 202 includes an extended space portion 202a surrounding the tip end portion of the nozzle tip 2 inserted into the nozzle insertion portion 201. The extended space portion 202a can have a shape and inner diameter extended in the radial direction centered on the tip end portion of the nozzle tip 2 inserted into the passage space portion 202.

In other words, when the nozzle tip 2 of the charging nozzle 1 is inserted into the nozzle insertion portion 201 in the receptacle 10 and is closely supported by the second ring 23, the extended space portion 202a can have a shape more extended in the radial direction compared to a section of the nozzle insertion portion 201 in contact with the outer circumferential surface of the tip end portion of the nozzle tip 2, and the inner circumferential surface of the extended space portion 202a can have a larger diameter than the inner circumferential surface of the section of the nozzle insertion portion 201 in contact with the outer circumferential surface of the tip end portion of the nozzle tip 2.

Moreover, in the extended space portion 202a in the receptacle 10 according to the first embodiment of the present disclosure, a sealing device 90 configured to further seal the nozzle tip 2 in the passage space portion 202 is installed. The sealing device 90 can include a movable O-ring 91 and a spring member 92.

The movable O-ring 91 can be installed in the extended space portion 202a in the internal space of the receptacle 10. The movable O-ring 91 can be installed to be brought into close contact with the outer circumferential surface of the tip end portion of the nozzle tip 2 inserted up to the passage space portion 202 in the receptacle 10.

Moreover, the spring member 92 can be installed at a rearward position of the movable O-ring 91 in the extended space portion 202a, which is a position opposite the filter space portion 203 where a filter portion (not shown) is disposed. The movable O-ring 91 can be elastically supported by the spring member 92 within the extended space portion 202a.

The orientations "front" and "rear" can be defined with respect to the insertion direction of the nozzle tip in the receptacle. When the charging nozzle is coupled to the receptacle, the nozzle tip may be said to enter forward inside the receptacle, and when the charging nozzle is separated from the receptacle, the nozzle tip may be said to move rearward inside the receptacle.

The movable O-ring 91 can closely support the outer circumferential surface of the tip end portion of the nozzle tip 2, passed through the nozzle insertion portion 201 in the receptacle 10 and inserted into the extended space portion 202a, in all 360° sections, for example. As such, the movable O-ring 91 can prevent the nozzle tip from sagging to one side within the nozzle insertion portion and supports the tip end portion of the nozzle tip so that the nozzle tip 2 and the nozzle insertion portion 201 are always concentric or remain mostly or substantially concentric. Moreover, the movable O-ring 91 can serve to further seal between the inner side surface of the receptacle 10 and the tip end portion of the nozzle tip 2 inserted into the receptacle 10 for charging.

In this configuration illustrated in FIG. 5, when hydrogen charging begins in the state in which the charging nozzle 1 is coupled to the receptacle 10 and the nozzle tip 2 of the charging nozzle 1 is inserted into the nozzle insertion portion 201 in the receptacle 10, the pressure of high-pressure hydrogen can act on the passage space portion 202 due to the hydrogen injected through the nozzle tip 2.

Accordingly, at a time point where the pressure of the high-pressure hydrogen is applied to the passage space portion 202, the movable O-ring 91, which may have moved forward within the extended space portion 202a, can move rearward while compressing the spring member 92 by the pressure of the hydrogen and then can be seated on and coupled to the outer circumferential surface of the tip end portion of the nozzle tip 2.

During charging, as illustrated in FIG. 5, the pressure of the high-pressure hydrogen can act on the front surface of the movable O-ring 91, causing the movable O-ring to move rearward. Eventually, the movable O-ring 91 can move and sit on the outer circumferential surface of the tip end portion of the nozzle tip 2, providing additional airtightness or sealing.

As such, the movable O-ring 91, in close contact with the outer circumferential surface of the tip end portion of the nozzle tip 2, can further seal the outer circumferential surface of the tip end portion of the nozzle tip 2 and simultaneously support the tip end portion of the nozzle tip 2 to prevent or hinder movement of the same, providing a more robust double airtight/sealing structure together with an O-ring 23 inside the nozzle insertion portion 201.

After completion of hydrogen charging, the pressure of the high-pressure hydrogen in the charging nozzle 1 and the receptacle 10 can be released before separating the charging nozzle 1. When the pressure is released, the movable O-ring 91 can move to its original position due to the elastic restoring force of the spring member 92 and move forward from the nozzle tip 2, allowing the nozzle tip 2 of the charging nozzle 1 to be easily separated from the nozzle insertion portion 201 in the receptacle 10.

Figure 6:
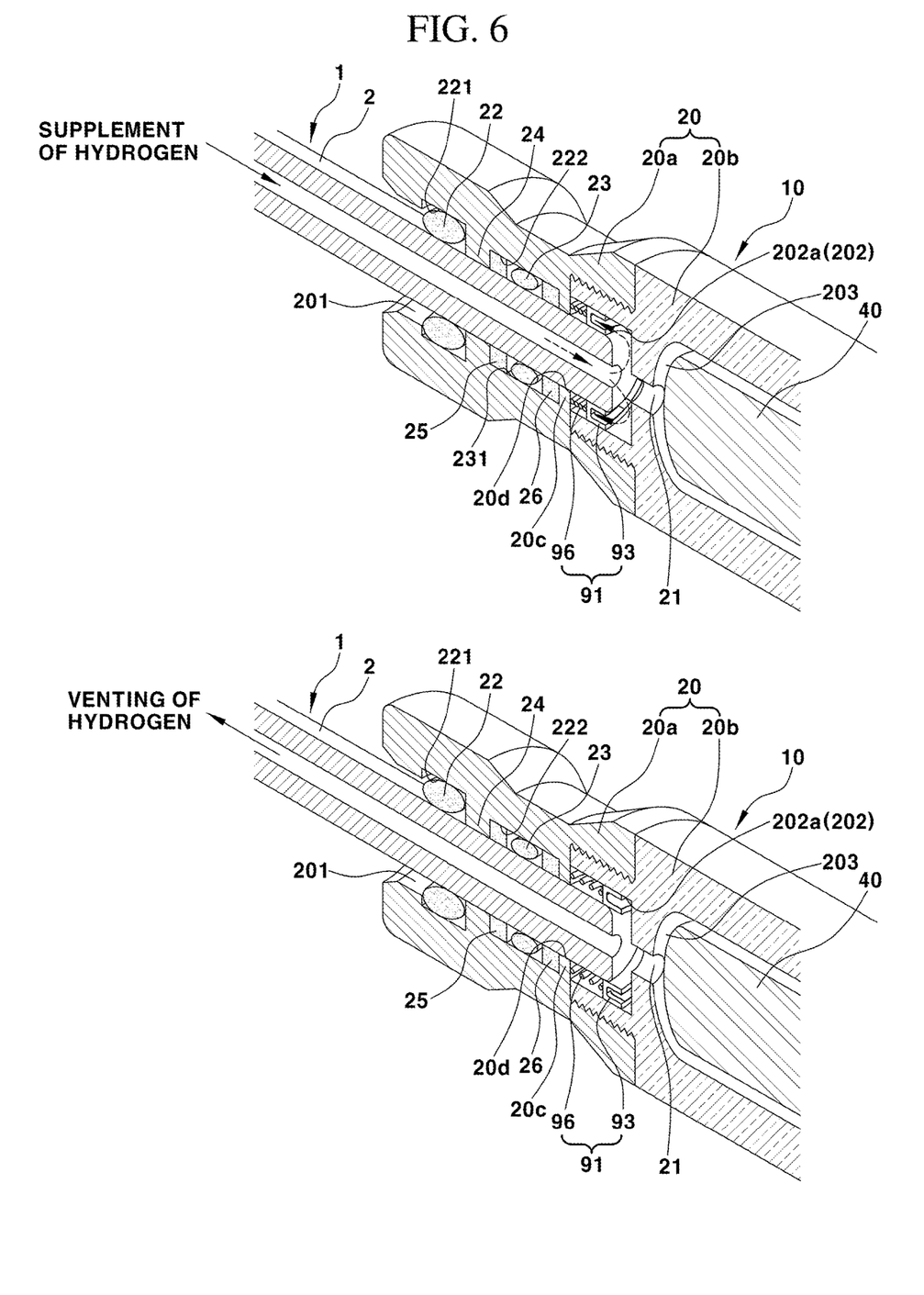
FIG. 6 is an enlarged cross-sectional view of a portion of a receptacle for hydrogen charging according to a second embodiment of the present disclosure.

FIG. 6 is an enlarged cross-sectional view of a portion of a receptacle for hydrogen charging according to a second embodiment of the present disclosure, illustrating a portion of a receptacle 10 including a nozzle insertion portion 201 into which a nozzle tip 2 of a charging nozzle 1 can be inserted and coupled, and illustrating states during charging and when charging is completed.

In the first and second embodiments, a body (a first body 20) of the receptacle 10 includes a first sub-body 20a and a second sub-body 20b. The first sub-body 20a and the second sub-body 20b can be screw-fastened to each other to be assembled into an integrated body 20, for example.

The first sub-body 20a can be a portion where a first ring 22 and a second ring 23 are installed. The second sub-body 20b can be a portion having formed therein a filter space portion 203 in which a filter portion 40 (not fully shown, denoted as reference numeral 41 in FIG. 3) is installed, and can be a portion to which a second body (not shown, reference numeral 30 in FIG. 3) can be screw-fastened.

Moreover, the first sub-body 20a and the second sub-body 20b can have formed therein the nozzle insertion portion 201 and a passage space portion 202 into which the nozzle tip 2 of the charging nozzle 1 can be inserted. The internal space in the first sub-body 20a and the internal space in the second sub-body 20b can be partitioned by a partition wall 20c protruding inward at an end of the first sub-body 20a.

In an embodiment, the partition wall 20c does not completely divide the two spaces, but partitions them so that the nozzle tip 2 may pass therethrough. The partition wall 20c can have formed therein a hole 20d through which the nozzle tip passes, and the inner diameter of the hole 20d can be large enough to allow the tip end portion of the nozzle tip 2 to pass therethrough.

Furthermore, in an embodiment, if the internal space in the first sub-body 20a with respect to the partition wall 20c is considered the nozzle insertion portion 201, then the internal space in the second sub-body 20b, bordering the nozzle insertion portion 201 with the partition wall 20c and communicating with the filter space portion 203 through a movement passage 21, can be the passage space portion 202.

In an embodiment, if the space extended in the radial direction centered on the passage through which the nozzle tip passes in the passage space portion 202 is considered an extended space portion 202a, then a sealing device 90 can be installed in the extended space portion 202a. As illustrated in FIG. 6, the sealing device 90 can include a pressure seal 93 and a spring member 96.

Before the first sub-body 20a and the second sub-body 20b are screwed to each other, the spring member 96 can be installed in the extended space portion 202a, which is the internal space in the second sub-body 20b, by being supported by the partition wall 20c, and the pressure seal 93 can be installed in the extended space portion 202a by being elastically supported by the spring member 96.

Figure 7:
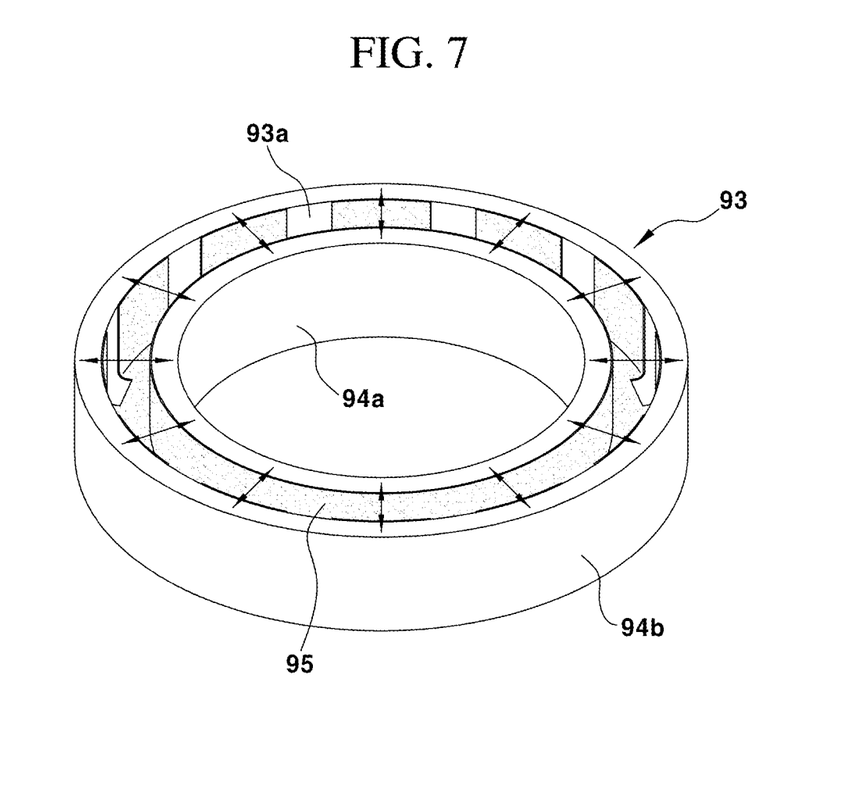
FIG. 7 is perspective view of a pressure seal that may be additionally used in the receptacle according to the second embodiment of the present disclosure.

FIG. 7 illustrates a pressure seal 93 that may be additionally used in the receptacle according to the second embodiment of the present disclosure. In the receptacle 10 according to the second embodiment, a high pressure seal as illustrated in FIG. 7 may be used as the pressure seal 93.

In the receptacle 10 according to the second embodiment, a general high pressure seal 93, wherein an inner side portion 94a and an outer side portion 94b of a seal body 93 spread apart from each other in the direction of the arrows in the drawing and the inner and outer circumferential surfaces of the seal body 93 can form surface pressure with other parts when high pressure acts on the inside of the seal body 93, and thus may be used as the pressure seal 93 elastically supported by the spring member 96.

The high pressure seal may have a structure in which the pressure seal 93 includes the seal body having a ring shape as a whole and having a c-shaped cross section, and a separate elastic member 95 can be installed in the inner side of the c-shaped cross-sectional portion of the seal body.

The pressure seal 93 can be installed in the extended space portion 202a in the second sub-body 20b, such that an opening 93a in the pressure seal 93 having the c-shaped cross section faces the movement passage 21 in front thereof (the front with respect to the direction in which the nozzle tip is inserted and entered) in the extended space portion 202a. Accordingly, the pressure of the high-pressure hydrogen may act on the inner side of the seal body in which the elastic member 95 is positioned, and simultaneously, the rear surface of the pressure seal 93, wherein the rear surface is opposite the opening 93a, can be supported by the spring member 96.

With such structure of an embodiment, when the nozzle tip 2 of the charging nozzle 1 is inserted into and coupled to the nozzle insertion portion 201 in the receptacle 10 for hydrogen charging, and hydrogen is injected into the passage space portion 202, which is an internal space in the second sub-body 20b of the first body 20 of the receptacle 10, via the nozzle tip 2, the hydrogen being charged passes the filter portion installed in the filter space portion 203 via the movement passage 21. The hydrogen being charged can also act on the pressure seal 93 in the internal space in the second sub-body 20b.

Therefore, the pressure seal 93 can move rearward while compressing the spring member 96 and can be fitted and coupled to the outer circumferential surface of the nozzle tip 2, and the pressure of the high-pressure hydrogen can act on the inner side of the seal body of the pressure seal 93 through the openings 93a at the front of the pressure seal 93 with the pressure seal 93 being seated on the outer circumferential surface of the nozzle tip 2, spreading the inner side portion 94a and the outer side portion 94b of the seal body of the pressure seal 93 apart from each other.

Thereafter, the inner side portion 94a of the seal body of the pressure seal 93 spread apart from the outer side portion 94b can be brought into close contact the outer circumferential surface of the tip end portion of the nozzle tip 2 that has passed the pressure seal 93, forming a surface pressure. The outer side portion 94b can be brought into close contact with the inner side surface of the receptacle 10, i.e., the inner side surface of the extended space portion 202a, forming a surface pressure. As such, when high-pressure hydrogen is supplied for charging, the pressure seal 93 can spread out due to the pressure of the hydrogen to form a surface pressure with the nozzle tip 2, providing an additional airtight/sealing structure between the nozzle tip 2 and the receptacle 10, in addition to an O-ring 23 installed in the first sub-body 20a.

It can be difficult to provide perfect airtightness and sealing between the charging nozzle 1 and the receptacle 10 only through close contact between the existing O-ring (the second ring 23) installed at the inner side surface of the receptacle 10 and the nozzle tip 2 because high-pressure hydrogen is rapidly charged at low temperature to shrink the O-ring.

Therefore, by further including a high pressure seal (e.g., the pressure seal 93) in the second embodiment, when charging begins, the pressure of the high-pressure hydrogen acts on the high pressure seal, further sealing between the nozzle tip 2 of the charging nozzle 1 and the receptacle 10 and providing a double airtight/sealing structure using the existing O-ring 23 and the high pressure seal 93.

Therefore, the receptacle 10 according to the second embodiment not only improves the sealing performance with the charging nozzle 1 but also eases the phenomenon of the nozzle tip 2 sagging due to its own weight because the nozzle tip 2 of the charging nozzle 1 is supported by the high pressure seal 93 while inserted into the receptacle 10.

During charging, the pressure of the high-pressure hydrogen can be applied within a pipe, allowing the pressure seal 93 to move toward the nozzle tip 2 while compressing the spring member 96 by the pressure of the hydrogen, and then providing and maintaining airtightness/sealing between the nozzle tip 2 and the receptacle 10. However, when charging is completed and the pressure in the high-pressure pipe is vented, the pressure seal 93 can move forward to its original position due to the elastic restoring force of the spring member 96 and can be separated from the nozzle tip 2, allowing the charging nozzle 1 to be easily separated from the receptacle 10. As such, the receptacle for hydrogen charging according to an embodiment of the present disclosure provides a structure that strengthens the airtightness/sealing between the charging nozzle and the receptacle when charging hydrogen in a fuel cell vehicle to thereby reliably maintain the airtightness/sealing between the charging nozzle and the receptacle during charging or after charging is completed.

The receptacle for hydrogen charging of a fuel cell vehicle according to an embodiment of the present disclosure provides a structure that strengthens the airtightness and hermetic sealing between the charging nozzle and the receptacle when charging hydrogen in the fuel cell vehicle, reliably maintaining the airtightness/sealing between the charging nozzle and the receptacle during charging.

Moreover, the receptacle for hydrogen charging according to an embodiment of the present disclosure further includes, in addition to the existing O-ring, a sealing device that maintains the airtightness and hermetic sealing between the nozzle tip of the charging nozzle and the receptacle to provide a double airtight/sealing structure, solving various conventional problems, such as gas leakage that can occur as the O-ring shrinks due to rapid cooling during rapid hydrogen charging, gas leakage that can occur when the charging nozzle is sagging due to its own weight, and gas leakage due to the mounting of the charging nozzle and receptacle.

Particularly, in an embodiment, the added sealing device can further support the tip end portion of the nozzle tip of the charging nozzle inserted into the nozzle insertion portion in the receptacle, preventing or hindering the nozzle tip of the charging nozzle from sagging to one side within the nozzle insertion portion and effectively preventing or reducing gas leakage due to sagging of the nozzle tip.

Although the present disclosure has been described in detail with reference to example embodiments, the scope of the present disclosure is not necessarily limited to the above-described embodiments, and various modifications and improvements by those skilled in the art using concepts of the present disclosure as defined in the claims below can also be included in the scope of the present disclosure.

What is claimed is:

1. A receptacle for hydrogen charging of a fuel cell vehicle, the receptacle comprising:
a body comprising:
a nozzle insertion portion into which a nozzle tip of a charging nozzle is to be inserted;
a filter space portion having installed therein a filter portion configured to filter hydrogen injected therein through the nozzle tip of the charging nozzle; and
a passage space portion provided between the nozzle insertion portion and the filter space portion; and
a sealing device configured to seal between a tip end portion of the nozzle tip and an inner side surface of an extended space portion by being installed in the extended space portion extended in a radial direction centered on the tip end portion of the nozzle tip which has passed through the nozzle insertion portion and entered the passage space portion,
wherein the sealing device comprises:
a movable O-ring installed in the extended space portion; and
a spring member configured to elastically support the movable O-ring by being installed on a spring support step formed on an inner side surface of the body and being positioned between the nozzle insertion portion and the passage space portion.

2. The receptacle of claim 1, further comprising an O-ring configured to seal between the nozzle tip and an inner side surface of the nozzle insertion portion by being installed at the inner side surface of the nozzle insertion portion through which the nozzle tip of the charging nozzle passes.

3. The receptacle of claim 1,
wherein the sealing device is configured such that when a pressure of the hydrogen injected through the nozzle tip of the charging nozzle acts on the extended space portion in the passage space portion during hydrogen charging, the movable O-ring moves while compressing the spring member using the pressure of the hydrogen to seat on an outer circumferential surface of the tip end portion of the nozzle tip.

4. The receptacle of claim 3, wherein the sealing device is configured such that, when hydrogen charging is completed and a pressure in the extended space portion is released, the movable O-ring is separated from the tip end portion of the nozzle tip by an elastic restoring force of the spring member.

5. A receptacle for hydrogen charging of a fuel cell vehicle, the receptacle comprising:
a body comprising:
a nozzle insertion portion into which a nozzle tip of a charging nozzle is to be inserted;
a filter space portion having installed therein a filter portion configured to filter hydrogen injected therein through the nozzle tip of the charging nozzle; and
a passage space portion provided between the nozzle insertion portion and the filter space portion; and
a sealing device configured to seal between a tip end portion of the nozzle tip and an inner side surface of an extended space portion by being installed in the extended space portion extended in a radial direction centered on the tip end portion of the nozzle tip which has passed through the nozzle insertion portion and entered the passage space portion,
wherein the sealing device comprises:
a pressure seal installed within the extended space portion; and
a spring member configured to elastically support the pressure seal by being installed on a spring support step formed on an inner side surface of the body and being positioned between the nozzle insertion portion and the passage space portion, and
wherein the sealing device is configured such that, when a pressure of the hydrogen injected through the nozzle tip of the charging nozzle acts on the extended space portion in the passage space portion during hydrogen charging, the pressure seal moves while compressing the spring member using the pressure of the hydrogen to seat on an outer circumferential surface of the tip end portion of the nozzle tip.

6. The receptacle of claim 5, wherein the pressure seal comprises:
a seal body having a ring shape as a whole and having a c-shaped cross-sectional portion; and
an elastic member installed in an inner side of the c-shaped cross-sectional portion of the seal body.

7. The receptacle of claim 6, wherein:
the c-shaped cross-sectional portion of the seal body has an opening facing toward the filter space portion, and
the sealing body being configured such that as the pressure of the hydrogen acts into the seal body through the opening, inner and outer side portions of the seal body spread apart, so that the inner side portion of the seal body is brought into close contact with the outer circumferential surface of the nozzle tip and the outer side portion of the seal body is brought into close contact with the inner side surface of the extended space portion to thereby generate surface pressures.

8. A receptacle for gas charging of a gas tank, the receptacle comprising:
a body comprising: a first end, a second end opposite the first end, and a central region located between the first end and the second end,
wherein the body comprises a nozzle insertion portion opening at the first end and extending into the central region,
wherein the body further comprises a gas passage portion in the central region, wherein the nozzle insertion portion is configured to receive a gas charging nozzle tip inserted therein during gas charging such that a distal end of the gas charging nozzle tip extends into the gas passage portion, and wherein the gas passage portion is in fluid communication with the nozzle insertion portion,
wherein the body further comprises an extended space portion located adjacent the gas passage portion, the extended space portion being in fluid communication with the gas passage portion, and
wherein the body further comprises a partition wall portion located adjacent the extended space portion and located between the nozzle insertion portion and the gas passage portion, the partition wall portion having a partition wall hole formed therein with a partition wall hole diameter configured to permit the gas charging nozzle tip to pass therethrough, wherein the extended space portion has an extended space portion diameter larger than the partition wall hole diameter;
a seal ring member located in the extended space portion, the seal ring member having a seal ring member hole formed therein with a seal ring member hole diameter configured to permit the gas charging nozzle tip to pass therethrough, wherein the extended space portion diameter is larger than the seal ring member hole diameter; and a spring located in the extended space portion, the spring being located between the seal ring member and the partition wall portion, the spring having an inner spring hole diameter configured to permit the gas charging nozzle tip to pass therethrough, wherein the extended space portion diameter is larger than the inner spring hole diameter.

9. The receptacle of claim 8, wherein the sealing ring member comprises a movable O-ring, wherein the movable O-ring and the spring are configured such that when a pressure of a gas injected through the gas charging nozzle tip acts on the movable O-ring during the gas charging, the movable O-ring presses against and compresses the spring using the pressure of the gas to seat on an outer circumferential surface of the distal end of the gas charging nozzle tip.

10. The receptacle of claim 9, wherein the movable O-ring and the spring are configured such that, when the gas charging is completed and a pressure in the extended space portion is released, the movable O-ring is separated from the distal end of the gas charging nozzle tip by an elastic restoring force of the spring pressing against the movable O-ring.

11. The receptacle of claim 8, wherein the sealing ring member comprises a generally c-shaped cross-section with an opening facing toward the second end of the body, wherein the sealing ring member and the spring are configured such that when a pressure of a gas injected through the gas charging nozzle tip acts on the sealing ring member during the gas charging, the sealing ring member presses against and compresses the spring using the pressure of the gas to sealably fit the sealing ring member onto the distal end of the gas charging nozzle tip.

12. The receptacle of claim 11, wherein the sealing ring member is configured such that when a pressure of the gas injected through the gas charging nozzle tip acts within the opening of the generally c-shaped cross-section, inner and outer side portions of the sealing ring member spread apart, so that the inner side portion of the sealing ring member sealably fits against an outer circumferential surface of the distal end of the gas charging nozzle tip and so that the outer side portion of a pressure seal sealably fits against an inner side surface of the body at the extended space portion.

13. The receptacle of claim 12, wherein the sealing ring member and the spring are configured such that, when the gas charging is completed and a pressure in the extended space portion is released, the spreading apart of the inner and outer side portions of the seal ring member reduces due to reduced gas pressure in the extended space portion, and the sealing ring member is separated from the distal end of the gas charging nozzle tip by an elastic restoring force of the spring pressing against the sealing ring member.

14. The receptacle of claim 8, further comprising a filter device located in a filter space portion of the body, wherein the filter space portion is adjacent to and in fluid communication with the gas passage portion, such that the gas passage portion is located between the filter space portion and the nozzle insertion portion.

15. The receptacle of claim 8, wherein the body comprises a first body portion and a second body portion, the first body portion being threadedly coupled to the second body portion at the central region and adjacent the partition wall portion.

16. The receptacle of claim 8, further comprising:
a first ring located in a first ring seat portion of the body, the first ring having a first ring hole therein with a first ring hole diameter configured to permit the gas charging nozzle tip to pass therethrough such that the first ring sealably fits on the gas charging nozzle tip, the first ring being located between the first end of the body and the seal ring member separated from the seal ring member by a first spaced distance; and a second ring located in a second ring seat portion of the body, the second ring having a second ring hole therein with a second ring hole diameter configured to permit the gas charging nozzle tip to pass therethrough such that the second ring sealably fits on the gas charging nozzle tip, the second ring being located between the first ring and the seal ring member separated from the seal ring member by a second spaced distance, wherein the first space distance is greater than the second space distance.

17. The receptacle of claim 16, wherein the partition wall portion and the spring are located between the second ring and the seal ring member.

18. A receptacle for gas charging of a gas tank, the receptacle comprising:
a body comprising a first end, a second end opposite the first end, and a central region located between the first end and the second end,
wherein the body comprises a nozzle insertion portion opening at the first end and extending into the central region,
wherein the body further comprises a gas passage portion in the central region, wherein the nozzle insertion portion is configured to receive a gas charging nozzle tip inserted therein during gas charging such that a distal end of the gas charging nozzle tip extends into the gas passage portion, and wherein the gas passage portion is in fluid communication with the nozzle insertion portion,
wherein the body further comprises an extended space portion located adjacent the gas passage portion, the extended space portion being in fluid communication with the gas passage portion,
wherein the body further comprises a partition wall portion located adjacent the extended space portion and located between the nozzle insertion portion and the gas passage portion, the partition wall portion having a partition wall hole formed therein with a partition wall hole diameter configured to permit the gas charging nozzle tip to pass therethrough, wherein the extended space portion has an extended space portion diameter larger than the partition wall hole diameter, and
wherein the body further comprises a first body portion and a second body portion, the first body portion being threadedly coupled to the second body portion at the central region and adjacent the partition wall portion;
a seal ring member located in the extended space portion, the seal ring member having a seal ring member hole formed therein with a seal ring member hole diameter configured to permit the gas charging nozzle tip to pass therethrough, wherein the extended space portion diameter is larger than the seal ring member hole diameter;
a spring located in the extended space portion, the spring being located between the seal ring member and the partition wall portion, the spring having an inner spring hole diameter configured to permit the gas charging nozzle tip to pass therethrough, wherein the extended space portion diameter is larger than the inner spring hole diameter;
a filter device located in a filter space portion of the body, wherein the filter space portion is adjacent to and in fluid communication with the gas passage portion, such that the gas passage portion is located between the filter space portion and the nozzle insertion portion;
a first ring located in a first ring seat portion of the body, the first ring having a first ring hole therein with a first ring hole diameter configured to permit the gas charging nozzle tip to pass therethrough such that the first ring sealably fits on the gas charging nozzle tip, the first ring being located between the first end of the body and the seal ring member separated from the seal ring member by a first spaced distance; and
a second ring located in a second ring seat portion of the body, the second ring having a second ring hole therein with a second ring hole diameter configured to permit the gas charging nozzle tip to pass therethrough such that the second ring sealably fits on the gas charging nozzle tip, the second ring being located between the first ring and the seal ring member separated from the seal ring member by a second spaced distance, wherein the first space distance is greater than the second space distance, wherein the partition wall portion and the spring are located between the second ring and the seal ring member.

* * * * *